US005790093A

United States Patent [19]

Takahashi

[11] Patent Number: 5,790,093

[45] Date of Patent: Aug. 4, 1998

[54] DOCUMENT PROCESSING APPARATUS

[75] Inventor: Tsutomu Takahashi, Kawasaki, Japan

[73] Assignee: Canon Kabushiki Kaisha, Tokyo, Japan

[21] Appl. No.: 460,089

[22] Filed: Jun. 2, 1995

Related U.S. Application Data

[63] Continuation of Ser. No. 997,141, Dec. 14, 1992, abandoned, which is a continuation of Ser. No. 597,163, Oct. 15, 1990, abandoned.

[30] Foreign Application Priority Data

Oct. 16, 1989 [JP] Japan .................................... 1-266343

[51] Int. Cl.[6] ........................................ G09G 5/22

[52] U.S. Cl. ........................ 345/141; 345/128; 345/168

[58] Field of Search ................................ 345/141, 142, 345/143, 144, 192, 193, 194, 195, 168, 127, 128, 129, 130, 471, 472

[56] References Cited

U.S. PATENT DOCUMENTS

| | | | |
|---|---|---|---|
| 4,827,254 | 5/1989 | Nishiyama et al. | 340/735 |
| 4,837,737 | 6/1989 | Watanabe | 340/735 |
| 4,843,593 | 6/1989 | Yanaru et al. | 340/735 |
| 4,849,747 | 7/1989 | Ogawa et al. | 340/735 |
| 4,868,554 | 9/1989 | Aoki et al. | 340/735 |

FOREIGN PATENT DOCUMENTS

| | | |
|---|---|---|
| 0119396 | 9/1984 | European Pat. Off. . |
| 0149069 | 7/1985 | European Pat. Off. . |

*Primary Examiner*—Xiao Wu

*Attorney, Agent, or Firm*—Fitzpatrick, Cella, Harper & Scinto

[57] ABSTRACT

A document processing apparatus such as word processor or electronic typewriter having a display includes: a pattern generator to generate a plurality of kinds of character patterns; a selecting key to select the kind of at least the character pattern to be output; a decoration information designating key to designate decoration information for the kind of the selected character pattern; a modifying circuit to modify the generated character pattern on the basis of the designated decoration information; an instructing key to instruct the confirmation of the kind of the selected character pattern and the designated decoration information; a display to display the character pattern generated from the pattern generator; and a controller for constructing each of the character patterns constructing the kind name of the selected character pattern by the character pattern of the name of the selected kind and modifying by the modifying circuit in accordance with the instruction of the instructing key and displaying the name of the kind of the selected character pattern by the display. A font memory is used as a pattern generator. With the apparatus, the designated character kind and decoration information can be confirmed at a glance while efficiently using the document editing display screen.

33 Claims, 3 Drawing Sheets

| | | | | | | | | | |
|---|---|---|---|---|---|---|---|---|---|
| 1 | C | O | U | R | I | E | R | | |
| 2 | T | I | M | E | S | | | | |
| 3 | H | E | L | V | E | T | I | C | A |
| 4 | O | P | T | I | M | A | | | |

DOCUMENT PROCESSING APPARATUS

This application is a continuation of application Ser. No. 07/997,141 filed Dec. 14, 1992, now abandoned which is a continuation of application Ser. No. 07/597,163, filed Oct. 15, 1990, now abandoned.

BACKGROUND OF THE INVENTION

1. Field of the Invention

The present invention relates to a document processing apparatus and, more particularly, to a document processing apparatus comprising a word processor or electronic typewriter having a display.

2. Related Background Art

In recent yearsdue to the advancement in printing apparatus, a high quality print document can be formed from a printing apparatus of the dot matrix type,a thermal printer, laser beam printer, or the like. On the other hand, not only the quality of the print character has been improved but also it is possible to print by freely combining character fonts such as Ming-style characters, Gothic-style characters, and the like, character styles such as blank characters, shadow characters, and the like, and various large and small character sizes. A variety of output results can be obtained as compared with conventional type printers.

Further, if a display of the graphics type is used, various fonts, styles, and sizes of print characters can be also displayed on the display, so that a beautiful document can be formed.

In such a document processing apparatus which can print a number of various kinds of characters, it is necessary to inform the operator of the character font and style which are selected and used at present by some method.

Such a function must be preformed in an apparatus such as an electronic typewriter which immediately prints characters which we input.

Although there already exists an apparatus which can individually display and inform the operator of the character font name, the character style, and the character size which were selected, such an apparatus has the drawback that it is difficult to display such information and such a displaying operation is complicated in the case of a small display.

SUMMARY OF THE INVENTION

The present invention is made in consideration of the above problems and it is an object of the invention to provide a document processing apparatus which can confirm the designated character kind and decoration information at a glance while efficiently using a document editing display screen.

Another object of the invention is to provide a document processing apparatus comprising: pattern generating means for generating a plurality of kinds of character patterns; selecting means for selecting the kind of at least the character pattern to be output; decoration information designating means for designating decoration information for the kind of character pattern which was selected by the selecting means; modifying means for modifying the character pattern which was generated from the pattern generating means on the basis of the decoration information which was designated by the decoration information designating means; instructing means for instructing the confirmation of the kind of character pattern selected by the selecting means and the decoration information designated by the decoration information designating means; display means for displaying the character pattern generated from the pattern generating means; and control means for controlling in a manner such that each of the character patterns constructing the name of the kind of the character pattern selected by the selecting means is constructed by the character pattern of the name of the selected kind and is modified by the modifying means in accordance with the instruction of the instructing means, thereby displaying the selected kind name by the display means.

Another object of the invention is to provide a document processing apparatus comprising: pattern generating means for generating a plurality of kinds of character patterns; selecting means for selecting the kind of at least the character pattern to be output; decoration information designating means for designating decoration information for the kind of the character pattern which was selected by the selecting means; instructing means for instructing the confirmation of the kind of the character pattern selected by the selecting means and the decoration information designated by the decoration information designating means; memory means into which the name of kind of the character pattern selected by the selecting means is stored by the character pattern corresponding to the kind; modifying means for modifying the character pattern stored in the memory means on the basis of the decoration information designated by the decoration information designating means; display means for displaying the character pattern; and control means for allowing the character pattern stored in the memory means to be displayed by the display means in accordance with the instruction of the instructing means.

Still another object of the invention is to provide a document processing apparatus comprising: pattern generating means for generating a plurality of kinds of character patterns; memory means for storing the character pattern generated from the character pattern generating means; selecting means for selecting the kind of at least the character pattern to be output; decoration information designating means for designating decoration information for the kind of the character pattern which was selected by the selecting means; modifying means for modifying the character pattern stored in the memory means on the basis of the kind of the character pattern selected by the selecting means and the decoration information designated by the decoration information designating means; instructing means for instructing the confirmation of the kind of the character pattern selected by the selecting means and the decoration information designated by the decoration information designating means; display means for displaying the character pattern stored in the memory means; and control means for allowing the character pattern stored in the memory means to be displayed by the display means in accordance with the instruction of the instructing means.

Still another object of the invention is to provide a document processing apparatus comprising: pattern generating means for generating a plurality of kinds of character patterns; selecting means for selecting the kind of at least the character pattern to be output; decoration information designating means for designating decoration information for the kind of the character pattern which was selected by the selecting means; modifying means for modifying the character pattern which was generated from the pattern generating means on the basis of the decoration information which was designated by the decoration information designating means; instructing means for instructing the confirmation of the kind of the character pattern selected by the selecting means and the decoration information designated by the decoration information designating means; display means for displaying the character pattern generated from the pattern generating means; and control means for controlling in a manner such that each of the character patterns constructing the name of the kind of the character pattern selected by the selecting means is constructed by the character pattern of the name of the selected kind and modified by the modifying means, in accordance with the instruction of the instructing means, a window is opened in a partial region on a display screen of the display means, and the name of the kind of the selected character pattern is displayed.

Another object of the invention is to provide a document processing apparatus comprising: pattern generating means for generating a plurality of kinds of character patterns; memory means for storing the character patterns which were generated from the character pattern generating means; selecting means for selecting the kind of at least the character pattern to be output; decoration information designating means for designating decoration information for the kind of the character pattern which was selected by the selecting means; converting means for converting the character pattern stored in the memory means into another character pattern in correspondence to the kind of the character pattern selected by the selecting means and the decoration information designated by the decoration information designating means; instructing means for instructing the confirmation of the kind of the character pattern selected by the selecting means and the decoration information designated by the decoration information designating means; display means for displaying the character pattern stored in the memory means; and control means for allowing the character pattern stored in the memory means to be displayed by the display means in accordance with the instruction of the instructing means.

DETAILED DESCRIPTION OF THE PREFERRED EMBODIMENT

An embodiment according to the present invention will be described in detail hereinbelow with reference to the drawings.

Figure 1:
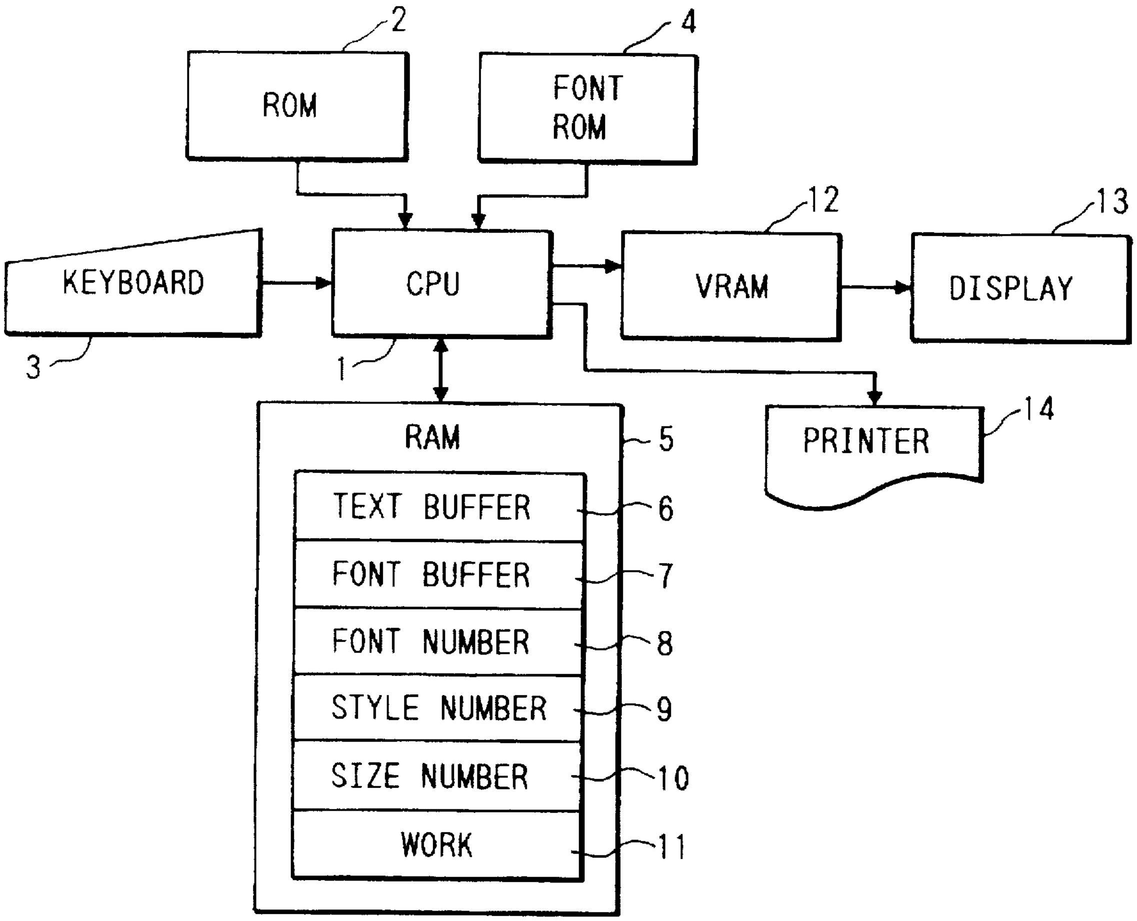
FIG. 1 is a schematic diagram showing a construction of a document processing apparatus in an embodiment.

FIG. 1 is a block arrangement diagram of a document processing apparatus in the embodiment.

In the diagram, reference numeral 1 denotes a CPU to control the entire apparatus. The CPU 1 operates in accordance with programs stored in an ROM 2. In addition to the program regarding document editing processes, a program regarding a flowchart of FIG. 4, which will be explained hereinlater, has been stored in the ROM 2. Reference numeral 3 denotes a keyboard having character keys corresponding to keys to be printed, keys (type style keys) to change a character font, a character style, and a character size, and keys to designate various functions. Reference numeral 4 denotes a character font ROM in which dot patterns constructing various kinds of characters have been stored. In the embodiment, the dot pattern data of one fundamental style and one fundamental size of each of four kinds of character fonts has been stored in the ROM 4.

Reference numeral 5 denotes an RAM which is used as a work area of the CPU 1. The following areas are provided in the RAM 5.

Data which was input from the keyboard 3 is stored as a code into a text buffer 6. Ordinarily, the dot pattern corresponding to the code stored in the text buffer 6 is read out of the font ROM 4 and is displayed by a display 13. A font buffer 7 is used to modify the dot pattern. The dot pattern which was read out of the font ROM 4 is stored in the font buffer 7 and is modified into the selected character style and character size. Such a modifying process, can comprise a deformation into, for instance, an underlined character, an oblique character, a blank character or a variable magnifying process into a vertically double-scale character in which one dot is made correspond to two dots in the vertical direction or the like. A font number 8 denotes a memory area to store the number corresponding to the kind of the selected character font. A style number 9 denotes a memory area to store the number corresponding to the selected character style. One character style (underlined character, oblique character, blank character, or the like) corresponds to each number. A size number 10 denotes a memory area to store the number of the selected character size. One character size (full-scale character, vertically double-scale character, or the like) corresponds to each number. A work 11 denotes a memory area which is used as a temporary work area.

A video RAM (VRAM) 12 is a RAM in which one bit corresponds to one display pixel of the display 13. In other words, the display screen of the display 13 corresponds to the VRAM 12 in a one-to-one corresponding relation. This means that if the operator wants to display data, it is sufficient to write the data into the VRAM 12.

Reference numeral 14 denotes a printer to print the edited document.

Figures 2, 3:
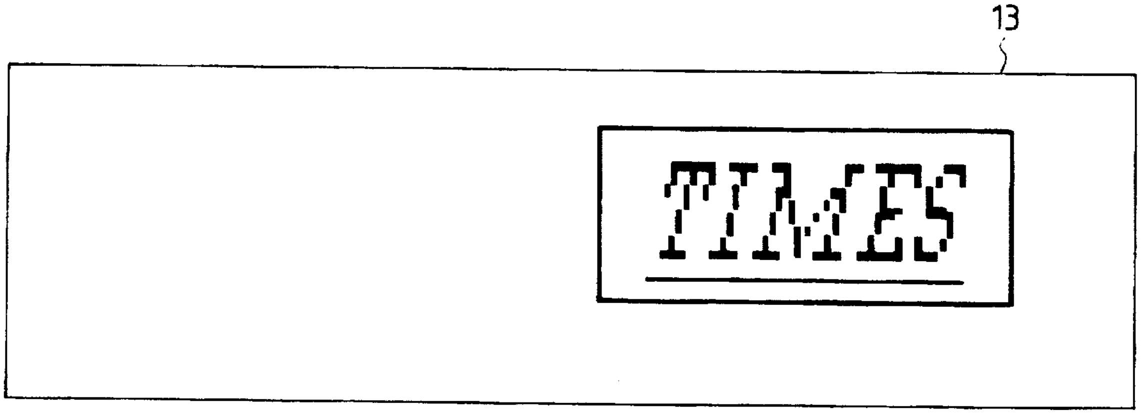
FIG. 2 is a diagram showing table contents of character font names in the embodiment.
FIG. 3 is a diagram showing a display example of a character font name to be realized according to the embodiment.

FIG. 2 shows a table of font names which can be displayed in the embodiment. The table has been stored in the font ROM 4. On the other hand, the table also corresponds to the data in which either one of the numerical values written on the left side of the font names in the table is stored into the font number 8.

The outline of the operation of the document processing apparatus in the embodiment with the above construction will now be described hereinbelow.

Ordinary document forming and editing processes are executed by depressing the keys from the keyboard 3 in a manner similar to the conventional one. However, to confirm or change the character kind, character style, size, and the like which have been designated at present, the type style key provided on the keyboard 3 is depressed.

Thus, the font name indicative of the character kind is displayed by the designated style and size into portion of the display screen which has displayed the key-input characters so far. During this period of time, the type style key is held depressed. However, after the character kind, character style, size, and the like is confirmed, the type style key is released from its pressed state, so that the processing routine is returned to the editing process.

For instance, assuming that "TIMES" (therefore, "2" is stored in the font number 8) was designated as a character kind and an underlined oblique character was designated as a style and a vertically double-scale size was designated as a size, by depressing the type style key, a display content as shown in FIG. 3 is obtained.

As described before, after the operator could confirm the above data by looking at the display content, it is sufficient to remove the hand from the type style key. However, in the case of changing the character kind or the like, the operator depresses the numeral keys of "1" to "3" with the type style key depressed.

When the "1" key is depressed while depressing the type style key, a selecting process (numerical value changing process of the font number 8) to the character kind which was selected by the operator is executed. In a manner similar to the above, when the "2" key is depressed, the selecting process of the character style is performed. When the "3" key was depressed, the size selecting process is executed. It is now assumed that each of the selecting processes is performed by displaying the selection items by the display screen in a menu style and by selecting a desired one of the selection items. However, each of the selecting processes can be also performed by a method other than the above method. After any one of the above selecting processes was executed, the data in the font number 8, style number 9, size number 10, or the like corresponding to the selecting process is updated and the processing routine is returned to the document editing process.

Figure 4:
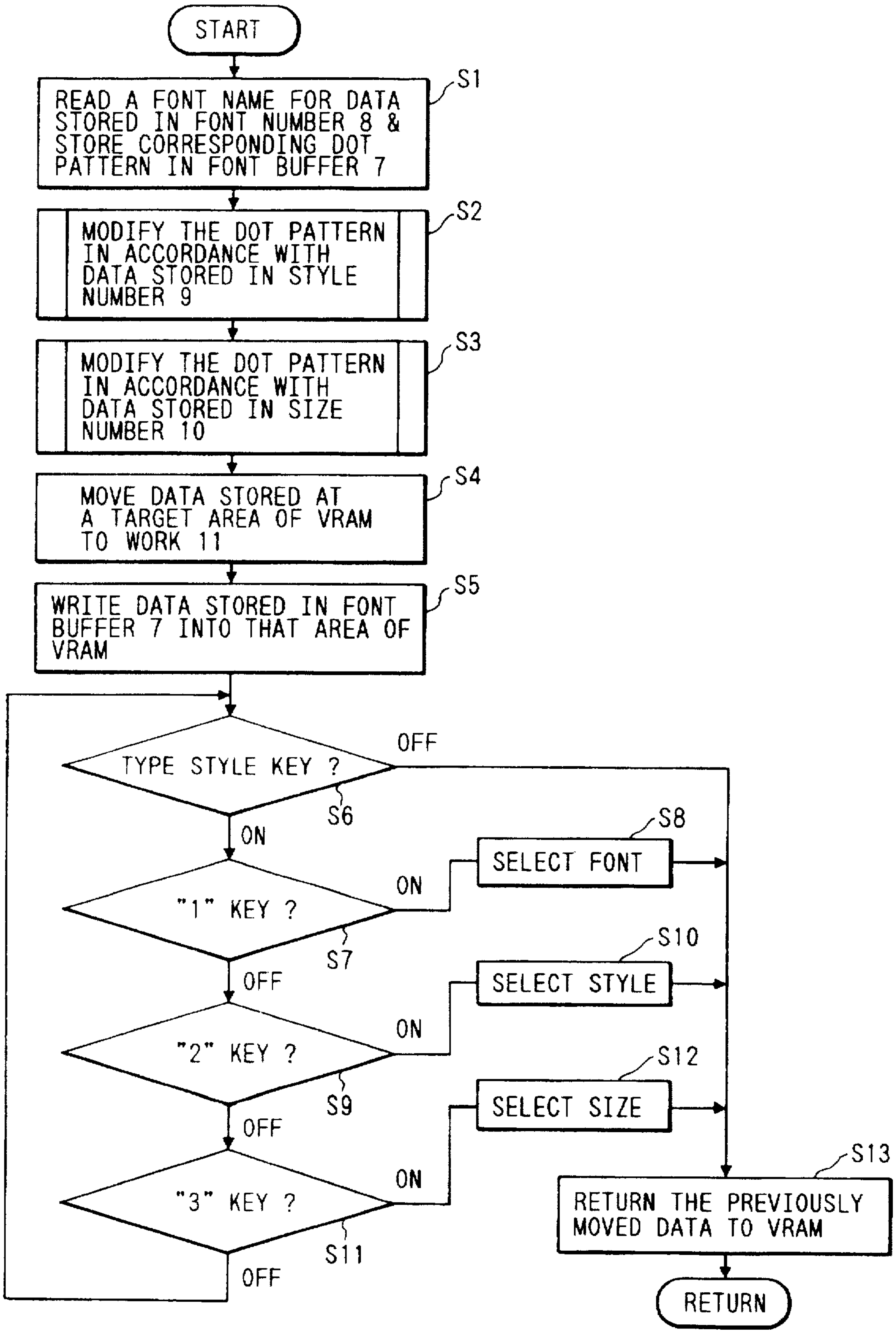
FIG. 4 is a flowchart showing a control processing content in the embodiment.

To realize the above processes, the CPU 1 in the embodiment carries out the processes in accordance with a flowchart shown in FIG. 4.

The flowchart is executed when the depression of the type style key is detected upon document editing.

First, in step S1, the font name corresponding to the data stored in the font number 8 is read out and the dot pattern is stored in the font buffer 7 by the corresponding font. In step S2, the dot pattern stored in the font buffer 7 is modified in accordance with the data in the style number 9. After that, step S3 follows and the variable magnifying process of the dot pattern in the font buffer 7 is executed in accordance with the data in the size number 10. Although the process to obtain an underlined character, the process to obtain an oblique character, the variable magnifying process, or the like in the modifying processes in steps S2 and S3 is executed by the well-known method, the modifying processes are not limited to them but a process to obtain a bold character and the like can be also likewise realized.

On the other hand, in place of executing the above modifying process, a plurality of dot patterns which have previously been modified are prepared in another memory and they can be also read out and stored into the font buffer 7.

After the dot patterns of the designated character kind name of the designated character kind, style, and size were obtained in the font buffer 7 as mentioned above, the processing routine advances to step S4. In step S4, the data which has already been stored at the location in the VRAM to be displayed is moved into the work 11. The data in the font buffer 7 is written at that position in step S5. In this manner, the display content as shown in FIG. 3 is derived.

In FIG. 3, a window region has been opened in a part of the display screen and the data in the font buffer 7 has been displayed. However, it is also possible to execute the designated modifying process to the character pattern of the document which has already been stored in the VRAM and to display the modified character pattern. Such a process can be realized by moving the document data in the VRAM into another memory and executing the modifying process to the character pattern constructing the document and, thereafter, by returning the character data into the VRAM.

In the next step S6, a check is made to see if the type style key is OFF (not depressed yet) or not. If only the type style key has been depressed or if the type style key is held depressed and the keys other than "1" to "3 " have been depressed, data as shown in FIG. 3 is displayed by the display 13.

On the other hand, if the type style key is OFF, the processing routine advances to step S13 and the data which has been moved into the work 11 is written at the original position in the VRAM 12. Then, by returning to the main routine, the document editing process can be continued.

On the other hand, if the type style key has been depressed and the depression of the "1" key has been detected in step S7, step S8 follows and the font selecting process is executed. Then, the processing routine advances to step S13. Similarly, if the depression of the "2" key has been detected in step S9, the style selecting process is performed in step S10. If the depression of the "3" key has been detected in step S11, the size selecting process is executed in step S12. Then, step S13 follows.

As described above, according to the embodiment, the designated character format can be confirmed at a glance while efficiently using the document editing display screen. Therefore, in the document processing apparatus having a small display, the designated character format can be confirmed while effectively using the whole display screen.

In the flowchart of FIG. 4 mentioned above, an explanation has been provided with respect to an example in which after the selecting processes in steps S8, S10, and S12 were finished, the processing routine advances to step S13. However, the above process relates to a change in character format. To confirm the change content, the processing routine can be also returned to step S1 after completion of the above processes.

The above embodiment has been described with respect to the case where four kinds of character patterns have been provided in the character font ROM 4 and the character style and size have been changed by modifying the dot pattern stored in the character font ROM 4. However, the dot patterns corresponding to all of the character styles and sizes can be also provided in the character font ROM 4. The character pattern can be also formed by using an outline font.

In the embodiment, the font name has been displayed by using the character font corresponding to the font. However, since the kind of character font can be discriminated from the font name, it can be also displayed by using a special character font.

Although the designated contents have been displayed by depressing the type style key in the embodiment, it is not limited to only the key but a switch or the like can be also used.

Further, although not particularly mentioned in the embodiment, it has been assumed that the characters which are displayed by the display apparatus 13 have sequentially changed on the basis of the selected character kind. However, the invention can be also applied to an apparatus such that the character font is integrated to, for instance, "COURIER" for the characters which are being edited for raising a processing efficiency and the characters are printed by the designated character kind, style, and size in the printing mode.

I claim:

1. A document processing apparatus comprising:

designating means for designating a first kind of character attribute from a plurality of kinds of character attributes;

modification means for modifying an input character input by input means on the basis of the first kind of character attribute designated by said designating means;

memory means for storing the input character modified by said modification means;

setting means for setting a character train representing a name of the first kind of character attribute designated by said designating means;

instruction means for instructing confirmation of a character attribute which has been designated; and control means for controlling a display to display the input character modified on the basis of the first kind of character attribute, stored in said memory means when said instruction means does not instruct the confirmation and to display the character train, representing the name of the first kind of character attribute set by said setting means when said instruction means instructs the confirmation.

2. An apparatus according to claim 1, further comprising means for forming a window on a portion of a display screen of the display, wherein said control means controls the display to display the character train, representing the name of the first kind of character attribute, set by said setting means in the window.

3. An apparatus according to claims 1, wherein said designating means designates a name of another one of the plurality of kinds of character patterns at a time during which said instruction means is activated.

4. A document processing apparatus according to claim 1, wherein said control means controls the display to display the character pattern in a display area after information which is currently in the display area is moved to memory means.

5. A document processing apparatus comprising:

selection means for selecting a first kind of character attribute from a plurality of kinds of character attributes;

modification means for modifying an input character input by input means on the basis of the first kind of character attribute selected by said selection means;

memory means for storing the input character modified by said modification means;

setting means for setting a character train representing a name for the first kind of character attribute;

instruction means for instructing confirmation of the kind of character attribute which has been selected by said selection means and the modification information which has been set by said setting means; and control means for controlling a display to display the input character modified on the basis of the first kind of character attribute, stored in said memory means when said instruction means does not instruct the confirmation and to display the character train, representing the name of the first kind of character attribute set by said setting means of the selected kind when said instruction means instructs the confirmation.

6. An apparatus according to claim 5, further comprising a font memory for storing the plurality of kinds of character attributes.

7. An apparatus according to claim 5, wherein the modification information includes information as to the style of a character attributes.

8. An apparatus according to claim 5, wherein the modification information includes information as to the size of a character attributes.

9. An apparatus according to claim 5, wherein each of said selection means, said setting means and said instruction means includes a key switch provided on a keyboard.

10. An apparatus according to claims 5, further comprising modifying means for modifying a character attribute representing the kind of character attribute which has been selected with the modification information which has been set, wherein said control means controls the character attribute modified by said modifying means to be displayed.

11. An apparatus according to claims 5, further comprising display means for displaying the kind of character attribute which has been selected and the modification information which has been set.

12. An apparatus according to claim 11, wherein said control means controls said display means to form a window thereon and display the kind of character attribute which has been selected and the modification information which has been set in the window.

13. A document processing apparatus comprising:

input means for inputting a character;

generating means for generating a plurality of kinds of character attributes;

selection means for selecting a first kind of character attribute corresponding to the input character from the plurality of kinds of character attributes;

memory means for storing the first kind of character attribute of the selected kind;

modification means for modifying the input character input by said input means on the basis of the first kind of selected character attribute;

setting means for setting a character train representing a name of the first kind of selected character attribute;

display means for displaying the input character and for displaying the character attribute stored in said memory means;

instruction means for instructing confirmation of the first kind of character attribute which has been selected by said selection means and the modification performed by said modification means; and control means for controlling said display means to display the input character modified on the basis of the first kind of character attribute, stored in said memory means when said instruction means does not instruct the confirmation which has been selected by said selection means and to display the character train, representing the name of the first kind of character attribute, set by said setting means when said instruction means instructs the confirmation.

14. An apparatus according to claim 13, wherein said generating means comprises a font memory which stores the plurality of kinds of character attributes.

15. An apparatus according to claims 13, wherein the modification means modifies the style and size of the input character on the basis of the first kind of selected character attribute.

16. An apparatus according to claim 13, wherein each of said selection means, said setting means and said instruction means includes a key switch provided on a keyboard.

17. An apparatus according to claim 13, further comprising print means for printing the character input by said input means in accordance with the first kind of selected character attribute.

18. An apparatus according to claim 13, further comprising modifying means for modifying the first kind of character attribute selected by said selection means, wherein said control means controls said display means to display the character attribute modified by said modifying means.

19. An apparatus according to claim 13, wherein said control means controls said display means to form a window thereon and to display the first kind of character attribute which has been selected in the window.

20. A document processing apparatus comprising:

input means for inputting a character;

selection means for selecting a first kind of character attribute corresponding to the input character from a plurality of kinds of attributes;

generating means for storing the first kind of character attribute selected by said selection means;

modification means for modifying the input character input by said input means on the basis of the first kind of selected attribute;

memory means for storing the input character modified by said modification means;

setting means for setting a character train representing a name of the first kind of selected attribute;

printing means for printing the input character in response to the first kind of attribute selected by said selection means and the modification performed by said modification means;

instruction means for instructing confirmation of the first kind of attribute which has been selected by said selection means and the modification performed by said modification means; and control means for controlling a display to display the input character, modified on the basis of the first kind of character attribute, stored in said memory means when said instruction means does not instruct the confirmation and to display the character train, representing the name of the first kind of character attribute, set by said setting means when said instruction means instructs the confirmation.

21. An apparatus according to claim 20, further comprising memory means for storing the character train generated by said generating means, wherein said print means prints the character train stored in said memory means.

22. An apparatus according to claim 20, further comprising modifying means for modifying a character attribute representing a name of the kind of selected attribute, wherein said control means controls the modified character attribute to be displayed.

23. An apparatus according to claim 20, further comprising display means, wherein said control means controls said display means to display the modified character attribute.

24. An apparatus according to claim 23, further comprising means for making a window on a portion of a display screen of said display means, wherein said control means controls said display means to display the modified character attribute in the window.

25. A character processing method comprising the steps of:

designating a first kind of character attribute from a plurality of kinds of character attributes;

modifying an input character input by input means on the basis of the first kind of character attribute designated in said designating step;

storing the input character modified by said modifying step;

setting a character train representing a name of the first kind of character attribute designated in said designating step;

instructing confirmation of a character attribute which has been designated; and controlling a display to display the input character, modified on the basis of the first kind of character attribute, stored in said storing step when said instructing step does not instruct the confirmation and to display the character train, representing the name of the first kind of character attribute, set in said setting step when said instructing step at a time during which said instructing step is performed instructs the confirmation.

26. A method according to claim 25, further comprising the step of instructing confirmation of the kind of selected character attribute, wherein the name of the selected character attribute is displayed on the display in response to an instruction given in said instructing step.

27. A method according to claim 26, further comprising a step of forming a window on a portion of a display screen of the display, wherein the character train representing the name of the first kind of the selected character attribute is displayed in the window.

28. A character processing method comprising the steps of:

instructing confirmation of a first kind of character attribute which has been selected in a selection step for selecting a first kind of character attribute from a plurality of kinds of character attributes and modification information which has been set in a step for setting modification information for the first kind of selected character attribute;

modifying an input character input by an inputting step on the basis of the [one] first kind of selected character attribute;

storing the input character modified by said modifying step;

setting a character train representing a name of the [one] first kind of selected character attribute; and displaying the input character, modified on the basis of the first kind of character attribute, stored in said storing step when said instructing step does not instruct the confirmation and displaying the character train, representing the name of the first kind of character attribute, set in said setting step when said instructing step instructs the confirmation.

29. A method according to claim 28, further comprising a step of modifying a character attribute of the first kind of character attribute which has been selected with the modification information which has been set, wherein the modified character attribute is displayed in said displaying step.

30. An apparatus according to claim 29, further comprising a step of storing the kind of selected character attribute and a step of storing the set modification information, wherein the character attribute is modified in said modifying step in response to the kind of character attribute and modification information stored in said storing step.

31. A character processing method comprising the steps of:

storing a first kind of character attribute in a selecting step for selecting a first kind of character attribute corresponding to an input character inputted in an inputting step from a plurality of kinds of character attributes generated in a generating step;

modifying the input character input in the inputting step on the basis of the first kind of selected character attribute;

storing the input character modified in said modifying step;

setting a character train representing a name of the first kind of selected character attribute;

instructing confirmation of the first kind of character attribute which has been selected in the selecting step and modification information which has been set in a setting step for setting modification information for the character attribute stored in said character attribute storing step; and displaying the input character modified on the basis of the first kind of character attribute of the input character stored in said input character storing step when said instructing step does not instruct the confirmation and displaying the character train, representing the name of the first kind of character attribute set by said setting step when said instructing step instructs the confirmation.

32. A method according to claim 31, further comprising a step of modifying a character attribute of the first kind of character attribute which has been selected with the modification information which has been set, wherein the modified character attribute is displayed in the window.

33. A method according to claim 32,further comprising a step of storing the kind of selected character pattern and a step of storing the set modification information, wherein the character pattern is modified in said modifying step in response to the kind of character pattern and modification information stored in said storing steps.

* * * * *

UNITED STATES PATENT AND TRADEMARK OFFICE

CERTIFICATE OF CORRECTION

PATENT NO. : 5,790,093

DATED : August 4, 1998

INVENTOR(S) : TSUTOMU TAKAHASHI

It is certified that error appears in the above-identified patent and that said Letters Patent is hereby corrected as shown below:

Column 1

Line 16, "yearsdue" should read --years due--.

Column 7

Line 9, "character" should read --character--.
Line 13, "attribute" should read --attribute,--.
Line 47, "character" should read --character,--.
Line 51, "attribute" should read --attribute,--.
Line 59, "attributes" should read --attribute--.
Line 62, "attributes" should read --attribute--.

Column 8

Line 37, "character" should read --character,--
Line 48, "claims" should read --claim--.

Column 10

Line 26, "[ONE]" should be deleted.
Line 30, "[ONE]" should be deleted.
Line 45, "An apparatus" should read --A method--.

UNITED STATES PATENT AND TRADEMARK OFFICE

CERTIFICATE OF CORRECTION

PATENT NO. : 5,790,093

DATED : August 4, 1998

INVENTOR(S) : TSUTOMU TAKAHASHI

It is certified that error appears in the above-identified patent and that said Letters Patent is hereby corrected as shown below:

Column 11
Line 5, "character" should read --character,--.
Line 7, "step" should read --step,--.
Line 10, "attribute" should read --attribute,--.

Signed and Sealed this

Fourteenth Day of September, 1999

Attest:

Q. TODD DICKINSON

*Attesting Officer* *Acting Commissioner of Patents and Trademarks*